US008572642B2

(12) United States Patent
Schraga

(10) Patent No.: US 8,572,642 B2
(45) Date of Patent: Oct. 29, 2013

(54) CUSTOMIZED PROGRAM INSERTION SYSTEM

(76) Inventor: Steven Schraga, Surfside, FL (US)

( * ) Notice: Subject to any disclaimer, the term of this patent is extended or adjusted under 35 U.S.C. 154(b) by 635 days.

(21) Appl. No.: 11/621,655

(22) Filed: Jan. 10, 2007

(65) Prior Publication Data

US 2008/0168489 A1    Jul. 10, 2008

(51) Int. Cl.
*H04N 7/10* (2006.01)

(52) U.S. Cl.
USPC .................................. 725/32; 725/34; 725/35

(58) Field of Classification Search
None
See application file for complete search history.

(56) References Cited

U.S. PATENT DOCUMENTS

| | | | |
|---|---|---|---|
| 4,731,743 A | 3/1988 | Biancato | |
| 4,872,056 A | 10/1989 | Hicks et al. | |
| 5,117,283 A | 5/1992 | Kroos et al. | |
| 5,233,423 A | 8/1993 | Jernigan et al. | |
| 5,491,517 A | 2/1996 | Kreitman et al. | |
| 6,177,931 B1 * | 1/2001 | Alexander et al. | 725/52 |
| 6,624,843 B2 | 9/2003 | Lennon | |
| 6,857,131 B1 | 2/2005 | Yagawa et al. | |
| 7,015,978 B2 | 3/2006 | Jeffers et al. | |
| 7,752,642 B2 * | 7/2010 | Lemmons | 725/32 |
| 7,912,219 B1 * | 3/2011 | Michener et al. | 380/239 |
| 2002/0080279 A1 * | 6/2002 | Wang et al. | 348/584 |
| 2002/0090133 A1 * | 7/2002 | Kim et al. | 382/164 |
| 2003/0030658 A1 * | 2/2003 | Gibbs et al. | 345/700 |
| 2004/0100556 A1 | 5/2004 | Stromme | |
| 2004/0109087 A1 | 6/2004 | Robinson et al. | |
| 2007/0226761 A1 * | 9/2007 | Zalewski et al. | 725/32 |

OTHER PUBLICATIONS

JibJab Sendables eCards, JibJab Media Inc., Jul. 18, 2008, retrieved from http://replay.waybackmachine.org/20080718012128/http://sendables.jibjab.com/.
Hallmark Augmented Reality Webcam Greetings, Peanuts Worldwide LLC, 2010, available at http://www.hallmark.com/online/webcam-greetings.aspx (accessed on Apr. 7, 2011).
"Hallmark will introduce 'augmented reality' greeting cards", Kansas City Business Journal, Jan. 12, 2010, available at http://www.bizjournals.com/kansascity/stories/2010/01/11/daily16.html (last modified Jan. 12, 2010).

* cited by examiner

*Primary Examiner* — Nasser Goodarzi
*Assistant Examiner* — Fred Peng
(74) *Attorney, Agent, or Firm* — Greenblum & Bernstein, P.L.C.

(57) ABSTRACT

A customized consumer advertisement module and process are provided for inserting a user selected object into a user selected category of program. The user stores model objects locally at the user site, or communicates the model objects to a remotely located broadcaster for storage at a broadcaster site. The user selects categories of programs in which the model objects, or portions thereof, will be inserted. The customized consumer advertisement module inserts the model objects, or portions thereof, into the selected categories of programs.

20 Claims, 7 Drawing Sheets

CUSTOMIZED PROGRAM INSERTION SYSTEM

FIELD OF THE INVENTION

The present invention relates to the field of communications. More particularly, the present invention relates to gathering, managing and inserting customized program information in communication systems.

BACKGROUND INFORMATION

User expectation has continued to grow concurrently with the advent of new technologies. Expectations for greater and more personalized services have developed in a variety of service industries with respect to inserting images or other visual information into another displayed image, replacing at least a portion of that display image. For example, U.S. Pat. No. 4,731,743 to BLANCATO describes a "Method and Apparatus for Displaying Hairstyles." In an effort to provide a user with a preview of how a particular hairstyle will appear on the user, i.e., without having to go through the actual haircut and hairstyling, BLANCATO stores a plurality of hairstyles on a disc associated with a computer. Subsequently, BLANCATO captures an image of the user and outlines the user's face. He then makes a number of modifications to the image, including overlaying particular hairstyles. BLANCATO then displays the overlayed image to the user for hairstyle assessment.

U.S. Pat. No. 6,624,843 to LENNON, entitled "Customer Image Capture and Use Thereof in a Retailing System," describes an image capture system used in a retailing environment. Particularly, LENNON describes a system that captures an image of a customer at a retailer's place of business. Subsequently, when the customer is in close proximity to an image display area within the retailer's place of business, a composite image including the customer's captured image and a reference image may be provided. The composite image may include full motion video or still images. Thus, a customer is provided with an opportunity to virtually assess particular merchandise without having to try on, for example, an apparel item.

U.S. Pat. No. 7,015,978 to JEFFERS et al., entitled "System And Method For Real Time Insertion Into Video With Occlusion On Areas Containing Multiple Colors," describes real-time insertion of indicia such as, for example, an advertisement, into a live or taped broadcast. JEFFERS et al. provide for insertion of indicia onto surfaces such as tennis courts, walls, grass or turf surfaces, or other surfaces shown during televised sporting events. To accomplish indicia insertion, JEFFERS et al. obtain video images from a camera, digitize the images, sample the digitized images into sampled pixels, and obtain a plurality of background colors for the sampled pixels. JEFFERS et al. then assign an opacity value to each pixel in the indicia based on whether the color of a positionally corresponding pixel in the video image is the same color as one of the plurality of background colors. Pixels are then displayed in the video image in dependence on whether the positionally corresponding pixel in the video image is the same color as one of the background colors.

Progress in computer processor speeds has significantly expanded the possible applications. It is not uncommon for ordinary personal computers to possess microprocessors that operate at clock cycles of 3.8 GHz or higher. Moreover, storage capacity has increased dramatically, where it is not uncommon to find ordinary personal computers that possess 200 Gigabyte hard-drives, which may be further expanded without any clearly defined limit.

A need exists for customized signal insertion and/or overlay in telecommunications systems, such as, for example, television and radio broadcasts. Particularly, a need exists for customized insertion and/or overlay of user defined images, sounds and other indicia in received signals on electronic devices such as, for example, televisions, computers, telephones, personal data assistants (PDAs), portable computers, radios, satellite receivers, and the like.

SUMMARY OF THE INVENTION

According to an aspect of the invention, an image insertion apparatus is provided for inserting a model object into at least one program. The object may comprise an image, a sound, or a combination of an image and a sound. The object insertion apparatus may be provided at a user site, a transmitter site, or a combination of the user site and transmitter site. The program may comprise a multimedia content signal that may be transmitted from the user site, the transmitter site, or a combination of the user site and transmitter site.

The object insertion apparatus includes a memory, a selector, a communicator and an inserter. The memory stores one or more model objects. The selector receives a selection of the one or more model objects and a selection of one or more categories of program. At least one of the categories of program includes the at least one program.

The communicator provides communication between the object insertion apparatus and a user. The communicator is configured to receive the selected one or more model objects and the selected one or more categories of program. The selected one or more model objects are provided to the inserter, which inserts and/or overlays the selected one or more model objects into the at least one program based on the selected one or more categories of program.

The object insertion apparatus further includes an object extractor, a feature extractor, an object processor, an encryptor, an encoder, a format converter, a decryptor, and a decoder. The decryptor decrypts a received multimedia signal, including the at least one program, when the received signal is determined to be encrypted. The decoder decodes the received multimedia signal, including the at least one program, and outputs a decoded multimedia signal. The decoded multimedia signal is provided to the format converter, which converts the decoded multimedia signal to a base composite signal, including the at least one program. The base composite signal includes an object field signal and an audio signal, where the object field signal and the audio signal may be the at least one program.

The object field signal is provided to the extractor, which extracts a portion of the object field signal from the at least one program. The object extractor generates a histogram for the extracted portion of the object field signal by transforming the extracted portion of the object field signal from a time domain to a frequency domain. The extracted portion of the object field signal is provided to the feature extractor, which extracts a feature from the extracted portion of the object field signal. The feature extractor generates at least one motion vector for the extracted portion of the object field signal. The extracted portion of the object field signal and the extracted feature from the extracted portion of the object field signal are provided to the object processor.

The object processor modifies the selected one or more model objects based on the extracted portion of the object field signal, and the extracted feature from the extracted portion of the object field signal, to generate one or more modified model objects. The object processor generates at least one insertion object from the one or more modified model objects based on the extracted portion and the generated histogram. The object processor inserts and/or overlays the one or more modified model objects in the object field signal to generate a modified composite signal, including a modified object field signal, which includes at least one modified program. The object processor may select at least one of an insertion and overlay mode based on a received mode signal.

The format converter converts the modified base composite signal, including the modified object field signal, which includes the at least one modified program, to a modified multimedia signal. The encoder encodes the modified multimedia signal to provide an encoded modified multimedia signal. Further, depending on whether encryption is necessary, the encryptor encrypts the encoded modified multimedia signal.

According to another aspect of the invention, an object insertion method is provided for inserting a selected object into at least one program. The at least one program may be associated with one of a plurality of categories of programs.

According to the method, one or more model objects are received and stored. At least one category of program is selected for which insertion or overlaying is desired to be performed. Further, at least one of the model objects is selected for insertion, or overlaying, in the at least one category of programs. The at least one category of programs includes the at least one program.

Communication is carried out between an object insertion apparatus and a user. The communication includes receiving the selected one or more model objects and the selected at least one category of program. The selected one or more model objects are inserted, or overlayed, in the at least one program based on the selected one or more categories of program.

Further, when a received signal is determined to be encrypted, the received signal is decrypted. The decrypted signal, or the received signal if it is received in decrypted form, is decoded to provide a decoded multimedia signal, which includes the at least one program. The decoded multimedia signal is format converted to generate a base composite signal, which includes the at least one program. The base composite signal includes an object field signal and an audio signal, where the object field signal and the audio signal may be the at least one program.

A portion of the object field signal is extracted from the at least one program. During the portion extraction process, a histogram may be generated for the extracted portion of the object field signal by transforming the extracted portion of the object field signal from a time domain to a frequency domain. A feature is extracted from the extracted portion of the object field signal to provide at least one extracted feature. During the process of feature extraction, at least one motion vector may be generated for the extracted portion of the object field signal. The extracted portion of the object field signal and the at least one extracted feature from the extracted portion of the object field signal are forwarded for object processing.

Object processing is provided for modifying the selected one or more model objects based on the extracted portion of the object field signal, and the extracted feature from the extracted portion of the object field signal, to generate one or more modified model objects. The object processing generates at least one insertion object from the one or more modified model objects based on the extracted portion and the generated histogram. The object processing inserts, or overlays, the one or more modified model objects in the object field signal to generate a modified composite signal, including a modified object field signal, which includes the at least one modified program.

Modified base composite signal, including the modified object field signal, which includes the at least one modified program, are format converted to a modified multimedia signal. The modified multimedia signal may be encoded to provide an encoded modified multimedia signal. Further, depending on whether encryption is necessary, the encoded modified multimedia signal may be encrypted to provide an encrypted encoded modified multimedia signal.

According to yet another aspect of the invention, a computer readable medium for storing a program that inserts a selected object into at least one program, the at least one program being associated with one of a plurality of categories of programs, is provided. The medium includes a storing code segment for storing one or more model objects; a category identifying code segment for identifying a category of program from the plurality of categories of programs; a model object selecting code segment for selecting a model object from the stored one or more model objects based on the identified category of program; an inserting code segment for inserting the selected model object in the at least one program. The medium further includes a receiving code segment for receiving the selected model object and the identified category of program from a user site.

Further, the medium includes a portion extracting code segment for extracting a portion of an object field signal; a feature extracting code segment for extracting a feature from the extracted portion of the object field signal; a modifying code segment for modifying the selected model object based on the extracted portion of the object field signal and the extracted feature from the extracted portion of the object field signal; a histogram generating code segment for generating a histogram for the extracted portion of the object field signal; and a motion vector generating code segment for generating at least one motion vector for the extracted portion of the object field signal.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout the several views of the drawings.

DETAILED DESCRIPTION OF THE INVENTION

Figure 1:
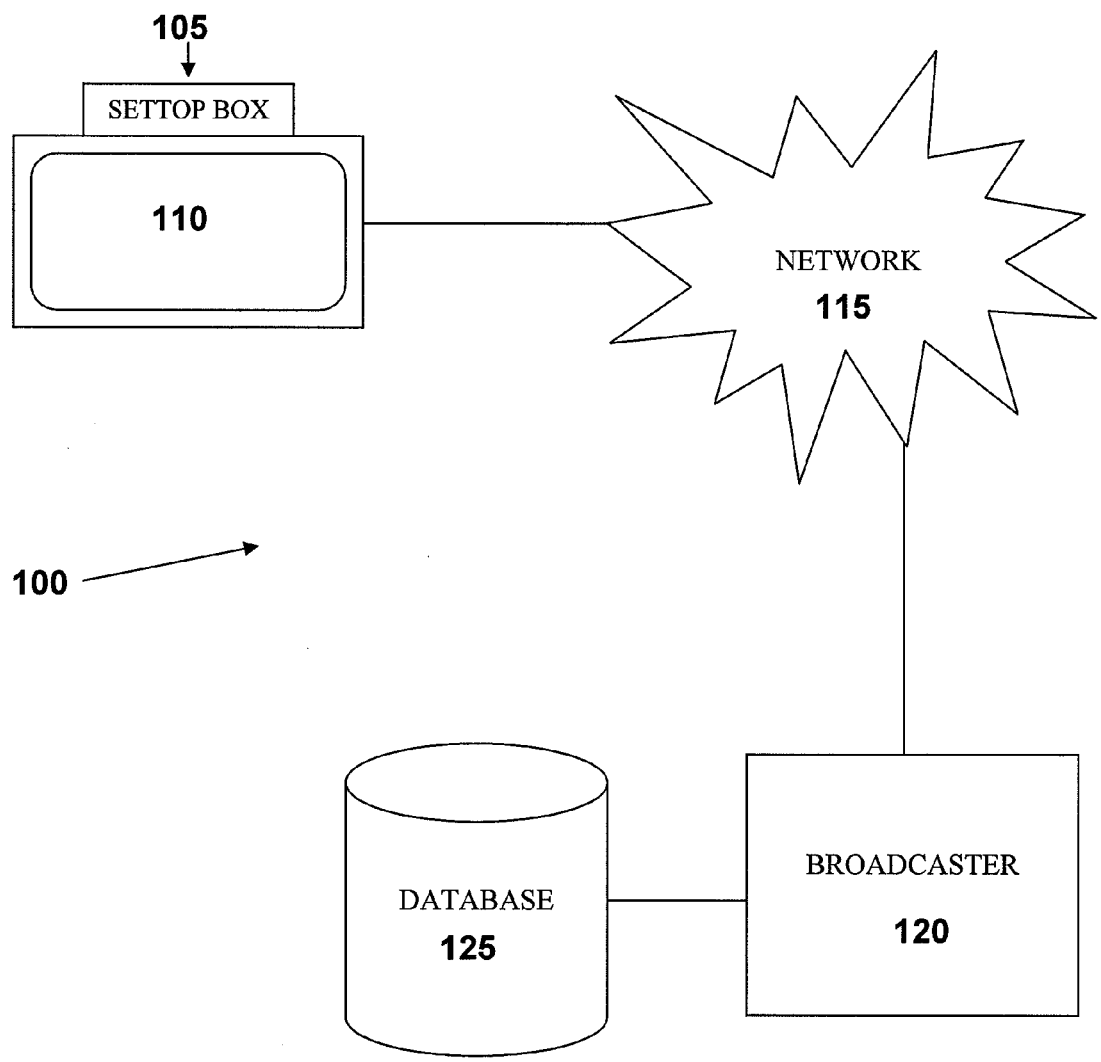
FIG. 1 illustrates an embodiment of a telecommunications system, according to an aspect of the present invention.

An embodiment of the invention is shown in FIG. 1. The system 100 includes a display device 110 for displaying moving or still images. The display device 110 may be, for example, a cathode ray tube (CRT), a liquid crystal display (LCD), a light emitting diode (LED) display, a plasma display panel (PDP), an organic light emitting diode (OLED) display, a surface-conduction electron-emitter display (SED), a carbon nanotube (CNT), a nanocrystal display (NCD), or the like. Moreover, the display device may include user-mounted devices such as, for example, a head-mount display, and/or a three-dimensional display such as, for example, a holographic display.

Further, the display device 110 can be a portable computer device such as, for example, a personal data assistant (PDA), telephone device, portable music player, portable game device, or any other portable computer device capable of displaying still and/or moving images.

The display 110 may include audio speakers (not shown), which are integrally configured in the display 110. However, speakers may be provided separately from the display 110, as is known in the relevant arts.

An image signal is provided to the display 110 via a Settop Box 105. The Settop Box 105 receives multimedia signals from a Broadcaster 120 via wired and/or wireless communications links. In the exemplary embodiment, the multimedia signals are received from a network 115, which may be a local area network, a wide area network, the Internet, or any combination of networks, including wired and/or wireless networks, as the skilled artisan will readily appreciate, without departing from the spirit and/or scope of the invention. The Settop Box 105 converts the received multimedia signal into a standard video image signal and/or a standard audio signal to be reproduced on the display 110. For example, the Settop Box 105 may be configured to decrypt the received multimedia signals and forward the signals as unencrypted, standard video image and/or audio signals capable of reproduction on display 110. The Settop Box 105 may be configured, for example, as device 200 shown in FIG. 2 (described in greater detail below), or it may be an off-the-shelf item available through, for example, local cable companies.

Alternatively, the video image and/or audio signals may be provided directly to the image display 110 from the network 115. In this case, the device 200 may be provided at the Broadcaster 120 or within the image display 110 as an integral device, or as a standalone device located remotely, but accessible to Broadcaster 120.

The multimedia signals are forwarded, or routed, to the Settop Box 105 via network 115 from a Broadcaster 120. A portion of Broadcaster 120 may be configured as device 200 shown in FIG. 2, as stated above. Alternatively, the Broadcaster 120 may include an existing configuration such as, for example, that of an existing cable television broadcaster. The Broadcaster 120 is linked to an external Database 125 for storing, managing and retrieving multimedia data to be broadcast by Broadcaster 120.

Figure 2:
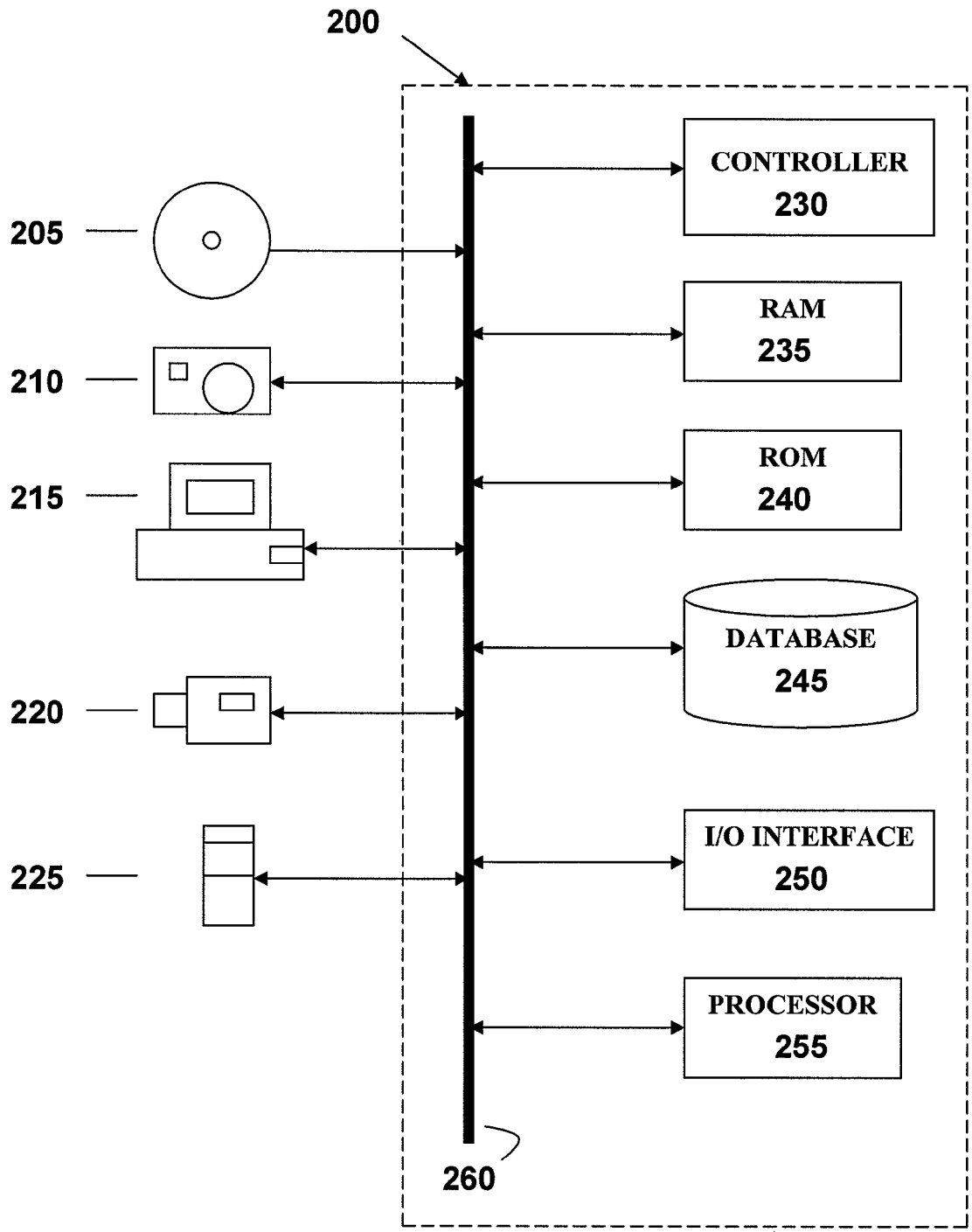
FIG. 2 illustrates an exemplary embodiment of an image insertion apparatus according to an aspect of the present invention.

In an embodiment, Settop Box 105 is configured as device 200 shown in, for example, FIG. 2 in broken lines. However, as stated above, the device 200 may be integrated into the display device 110, the Broadcaster 120, or provided as a separate stand-alone unit at the Broadcaster 120 site or the user site without departing from the scope and/or spirit of the invention.

The device 200 is a Custom Consumer Advertisement Module (CCAM), which may be a standalone device or embodied in another device. CCAM 200 includes a plurality of ports for communicating with other devices, such as multimedia devices 205-225. The CCAM 200 may be coupled to devices 205-225 through wired links, such as, for example, universal serial buses (USB), or through wireless links, such as, for example, optical or electromagnetic frequency communications devices (for example, infrared diode transceivers, radio frequency transceivers, etc.).

The CCAM 200 may be coupled to an external digital video disc (DVD) player 205 through wired or wireless communication linkage to receive multimedia signals from the DVD 205 for display on display 110. Alternatively, the DVD 205 may be internal to the Settop Box 105. The DVD 205 reads multimedia signals from a source DVD, or alternatively, a Blue-ray disc (BD), compact disc (CD), Super Audio compact disc (SACD), or the like, and provides the multimedia signals to a random access memory (RAM) 235. However, the RAM 235 may be bypassed and the multimedia signals from the DVD 205 may be forwarded to a Database 245 for storage.

The CCAM 200 may be configured to be coupleable to a digital camera 210, for retrieving images stored in the camera 210. The CCAM 200 may be configured for real-time image capture using camera 210. The camera 210 may be internal to the Settop Box 105, or it may be provided as a separate, external device that is coupleable to the Settop Box 105.

Further, the CCAM 200 may be coupled to a computer device 215 such as, for example, a personal computer, a desktop computer, a workstation, a laptop computer, a notebook computer, a portable computer, a tablet computer, or the like. Multimedia signals stored in or generated by the computer device 215 may be retrieved and processed by the CCAM 200. The computer device 215 may be integral to the Settop Box 105, or it may be provided externally as shown in, for example, FIG. 2.

Further, the CCAM 200 may be coupled to a video camera 220 for capturing moving images. Moving images may be downloaded from the video camera 220, or may be captured real-time by the video camera 220 under control of the CCAM 200. The video camera may be integral to the Settop Box 105, or it may be provided externally as shown in, for example, FIG. 2.

Further, the CCAM 200 may be coupled to a personal device (PD) 225 such as, for example, a personal data assistant (PDA), a telephone device, or any other computer device capable of providing multimedia signals. The CCAM 200 communicates with PD 225 to exchange multimedia signals. For example, the CCAM 200 may download multimedia signals, such as, for example, still images, moving images, audio segments, computer programs, including computer instructions, and/or global position system (GPS) information from the CCAM 200 to the PD 225. Moreover, the PD 225 may upload multimedia signals, such as, for example, still images, moving images, audio segments, computer programs, including computer instructions, GPS information, and the like, to the CCAM 200.

In an embodiment, the CCAM 200 includes a Controller 230, Random Access Memory (RAM) 235, Read Only Memory (ROM) 240, Database 245, Input/Output (I/O) Interface 250, and Processor 255 for carrying out aspects of the invention.

The Controller 230 controls task management of the components of CCAM 200. In a particular embodiment, the CCAM may include a disc drive unit (not shown), including a computer-readable medium in which one or more sets of instructions, e.g., software and/or segments of code, may be embedded. Further, the instructions may embody one or more of the methods or logic as described herein. In a particular embodiment, the instructions may reside completely, or at least partially, within the Controller 230, the RAM 235, the ROM 240, the Processor 255 and/or the Database 245 during execution by the CCAM 200. The RAM 235, the Database 245 and the Processor 255 also may include computer-readable media. The CCAM 200 operates under control of the Controller 230, to perform customized advertisement insertion.

In alternative embodiments, dedicated hardware implementations for the CCAM 200, such as, for example, application specific integrated circuits, programmable logic arrays and other hardware devices, can be constructed to implement one or more of the methods described herein. Applications that may include various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor, or that cause a computer system to perform any one or more of the methods or operations disclosed herein.

The computer-readable medium may further include a solid-state memory, such as a memory card, that houses one or more non-volatile read-only memories. Further, the computer-readable medium can be a random access memory or other volatile re-writable memory. Additionally, the computer-readable medium can include a magneto-optical or optical medium, such as a disc or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using, for example, CCAM 200 shown in FIG. 2, a process for customized advertisement insertion may be provided. The system of FIG. 2 can also operate as various elements within the system. For example, a program implementing the disclosure may be loaded and executed on one or more computers.

Figure 3:
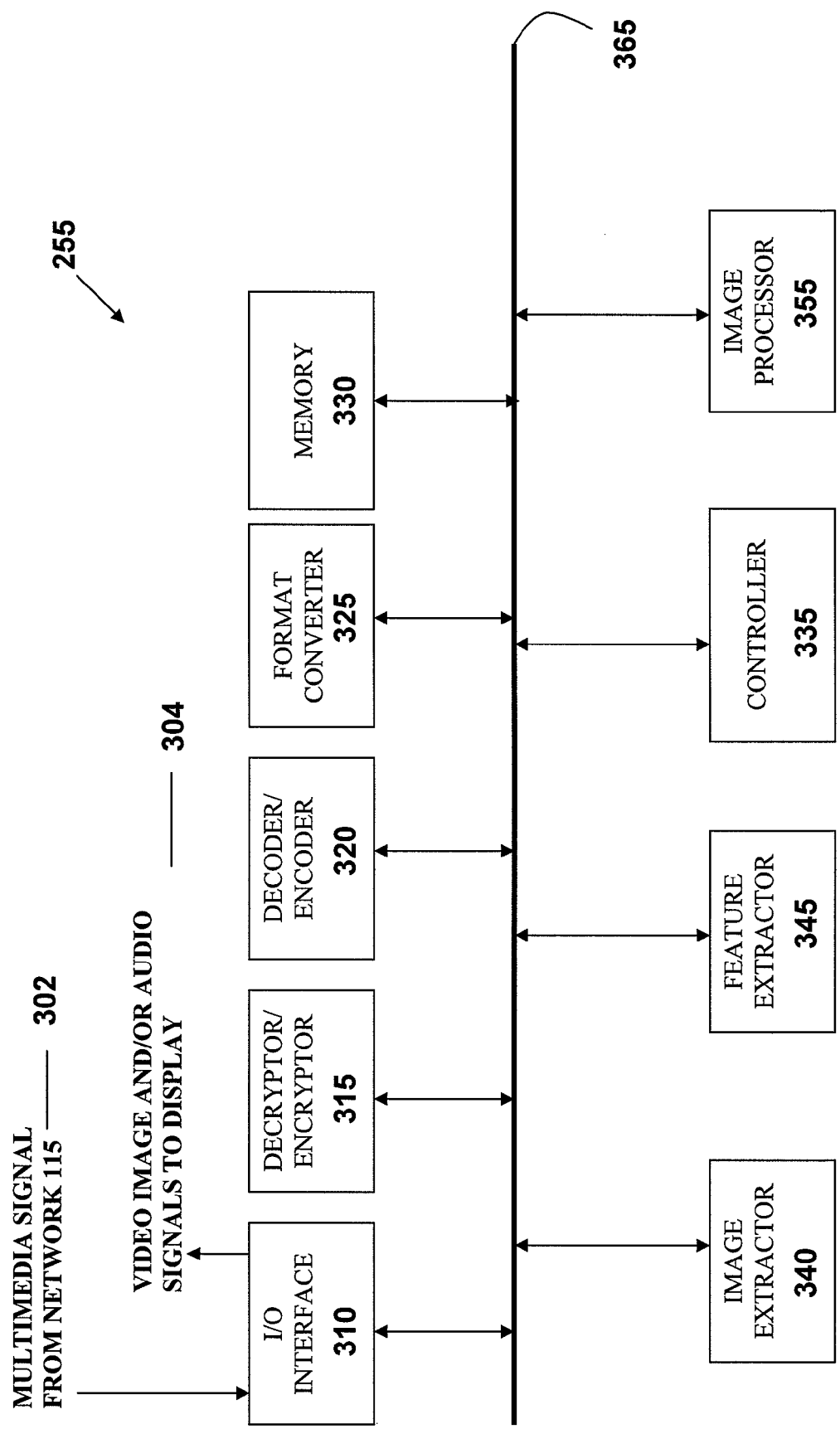
FIG. 3 illustrates an exemplary embodiment of a customized consumer advertisement module according to an aspect of the present invention.

An exemplary, non-limiting embodiment of the Processor 255 (shown in FIG. 2) is provided in FIG. 3. The Processor 255 may include an Input/Output (I/O) Interface module 310 for receiving and sending information; a Decryptor/Encryptor module 315 for decrypting/encrypting signals received from, or to be sent through the I/O Interface module 310; a Decoder/Encoder module 320 for decoding and/or encoding signals received, or to be sent through I/O Interface module 310; a Format Converter module 325 for converting signals to an appropriate format for display and/or signal processing; a Memory module 330 for storing information; a Controller module 335 for controlling task management in the Processor 255; an Image Extractor module 340 for extracting portions of an image signal; a Feature Extractor module 345 for extracting features from the extracted portion of the image signal; and an Image Processor 355 for processing a multimedia signal 302 received by the I/O Interface module 310. The modules communicate via a bus 365.

In an embodiment, the I/O Interface 310 receives the multimedia signal 302 from the network 115. The I/O Interface 310 forwards the received multimedia signal 302 to the Decryptor/Encryptor module 315 and/or the Decoder/Encoder module 320, via the bus 365.

Alternatively, the I/O Interface 310 may be integrated with the I/O Interface 250 (shown in FIG. 2), or eliminated entirely and only the I/O Interface 250 used instead. Moreover, the bus 365 may be eliminated and modules 310 to 355 may be coupled via bus 260 (shown in FIG. 2).

The received multimedia signal 302 is forwarded to the Decryptor/Encryptor module 315. The Decryptor/Encryptor module 315 decrypts the multimedia signal 302, as is well known in the art, and forwards the decrypted signal to Decoder/Encoder module 320. However, if the multimedia signal 302 is not encrypted by, for example, the Broadcaster 120 (FIG. 1), the Decryptor/Encryptor module 315 is not activated and the multimedia signal 302 is forwarded directly to the Decoder/Encoder 320.

The Decoder/Encoder 320 detects the multimedia signal 302, for example, by decoding and decompressing the multimedia signal 302, so as to provide a base composite signal, including an uncompressed video image signal and/or audio signal. The Decoder/Encoder 320 may include video and audio codecs capable of decoding and/or encoding signals having the following exemplary formats: ISO/IEC: MPEG-1, MPEG-1 Layer III (known as MP3), MPEG-1 Layer II, MPEG-2, MPEG-4, MPEG-4/AVC, MC; HE-AAC; ITU-T: H.261, H.262, H.263, H.264, G.711, G.722, G.722.1, G.722.2, G.723.1, G.726, G.728, G.729, G.729.1, G729a; SMPTE: VC-1; AVS; Dirac; Indeo; MJPEG; RealVideo; Theora; VP7; WMV Audio; AC3; ATRAC; FLAC; iLBC; Monkey's Audio; Musepack; RealAudio; SHN; Speex; Vorbis; WavPack; WMA Image compression formats: ISO/IEC/ITU-T: JPEG, JPEG 2000, JPEG-LS, JBIG, JBIG2; BMP; GIF; ILBM; PCX; PNG; TGA; TIFF; WMP Media container formats 3GP; ASF; AVI; FLV; Matroska; MP4; MXF; NUT; Ogg; Ogg Media; QuickTime; RealMedia; AIFF; AU; and WAV. The base composite signal is forwarded to the Format Converter 325 and the Memory module 330.

The Format Converter 325 is configured to convert from the image/audio format to a base composite signal, including a video image field signal and/or audio signal, and to convert from a base composite signal to the image/audio formats, e.g., as identified above, as the skilled artisan will readily recognize and comprehend. The resultant base composite signal includes a video image field signal and/or an audio signal, where the audio signal may be the sound signal corresponding to the image field signal. As a result, information may be obtained from devices 205 to 225 (shown in FIG. 2), which may provide for different formats (such as, for example, those mentioned above), other than, for example, an MPEG video format used by display 110 (shown in FIG. 1). Moreover, information may be forwarded to devices 205 to 225 after conversion of the base composite signals by the Format Converter 325 to a format useable by devices 205 to 225, as is known in the art.

The Memory 330 stores decoded signals decoded by Decoder/Encoder module 320, as well as base composite signals output by Format Converter module 325. The Memory 330 may serve as a temporary storage for working data used by the Processor 255.

The Image Extractor module 340 analyzes the composite signals stored in the Memory 330. In accordance with instructions received from the Controller 335, the Image Extractor 340 determines which portions of an image field component, for example, of a base composite signal to extract. The extraction determination is made based on, for example, image recognition techniques and/or edge detection of the image field signal, as is well known by those skilled in the image processing technologies.

In one non-limiting example according to an aspect of the invention, the Image Extractor 340 may extract the face of an Actor in a television commercial for an automobile. The Image Extractor 340 transforms the extracted portion of the image field—in this example, the Actor's face—from the time domain to the frequency domain using, for example, a cosine transform, a Fourier transform, or any other well known image processing transform, to provide a histogram of the extracted portion (e.g., the Actor's face).

The Feature Extractor 345 receives the extracted portion of the image field and the corresponding histogram for each image field signal. The Feature Extractor 345 derives a plurality of motion vectors for the extracted portion of the image field through, for example, phase correlation between two or more image fields, or any other image motion vector generation scheme as is known in the art. The derived motion vectors provide, for example, movement information regarding the different parts of the extracted portion of the image field. For example, in the above mentioned automobile advertisement, the Feature Extractor 345 would identify the movement vectors pertaining to, for example, the movement of the Actor's lips, eyes, facial muscles, eyebrows, etc. The Feature Extractor 345 outputs the generated motion vectors for each field.

Under control of the Controller 335, the output motion vectors from the Feature Extractor 345 are correlated to the corresponding extracted portions and histograms output from the Image Extractor 340 for each image field. The motion vectors and the corresponding extracted portions and histograms are stored in the Memory 330. However, the skilled artisan will readily appreciate that the image portion extraction and histogram generation of the Image Extractor 340 may be correlated to the motion vector generation of the Feature Extractor 345 without instructions from the Controller 335.

The Image Processor 355 receives the original image field signal, the corresponding extracted portions, the corresponding histogram, and the corresponding motion vectors for the original image field signal from the Memory 330. However, the Image Processor 355 may receive the corresponding extracted portions, the corresponding histogram, and the motion vectors directly from the Image Extractor 340 and the Feature Extractor 345. The Image Processor 355 further retrieves a three-dimensional model image from the Memory 330 and/or the Database 245 (shown in FIG. 2). The Image Processor 355 extracts a portion of the three-dimensional model image to provide a model insertion image signal, which will be inserted into the composite signal in lieu of or as an overlay of the extracted portion.

In alternative embodiments, the Image Processor 355 determines the model insertion image signal in at least one of two ways. However, the skilled artisan will readily recognize that other methodologies may be equally employed without departing from the scope and/or spirit of the invention.

For example, an image azimuth angle signal $\Theta$ and an image altitude angle signal $\phi$ may be included in each image field signal for each portion to be extracted from the image field. The image azimuth and altitude angle signals jointly referred to as the composite angle signal, which include coordinates $\Theta$ and $\phi$) would allow, for example, the Image Processor 355 to determine that the extracted portion (such as, the Actor's face in the automobile advertisement mentioned above) is a direct ($\phi=0$ degrees), front angle ($\Theta=0$ degrees) camera shot of the Actor's face. The composite angle signal ($\Theta$, $\phi$) may be provided by the Broadcaster 120 (shown in FIG. 1), for example, in the blanking interval or vestigial sidebands in the case of an analog signal, or in the extended data packets in the case of a digital signal.

Alternatively, the Image Processor 355 may be configured to analyze an extracted portion for each image field and identify the azimuth and altitude angles of the extracted portion. For example, the Processor 355 may analyze the extracted portions and corresponding histograms output from Image Extractor 340, and the extracted motion vectors output by the Feature Extractor 345 over a plurality of image fields to determine, for example, a distance between an Actor's eyes relative to the Actor's nose, as well as a distance between the Actor's eyes and the Actor's hair-line and/or a plurality of points along a perimeter of the Actor's head.

Once the model insertion image has been identified, the scale of the identified model insertion image may be adjusted by the Image Processor 355, so as to coincide with the scale of the extracted portion. Moreover, the model insertion image may be adjusted in terms of display characteristics such as hue, saturation color space, contrast, brightness, color temperature, and the like, to match similar attributes of the extracted portion. Further, the surrounding portions of the original image field, adjacent to the extracted portion, are also analyzed in terms of the above display characteristics and the resultant data may be used to further modify the identified model insertion image so as to provide proper blending of the identified model insertion image into the original image field.

The Image Processor 355 further determines feature adjustment in the extracted portion based on, for example, the motion vectors provided by Feature Extractor 345. Particularly, Image Processor 355 adjusts parts of the identified model image to match similar parts in the extracted portion. For example, in the above automobile advertisement example, where the face of an Actor has been extracted by Image Extractor 340, the Image Processor will determine, for example, movement of the Actor's eyes and lips based on the motion vectors provided by Feature Extractor 345 and apply similar motion vectors to the identified model image (i.e., the image to be inserted). Thus, in the automobile advertisement example, an image of the user's face, for example, will be inserted into the original image fields such that the user's face will replace the Actor's face, including the specific gestures, body language, and other attributes.

Figure 4:
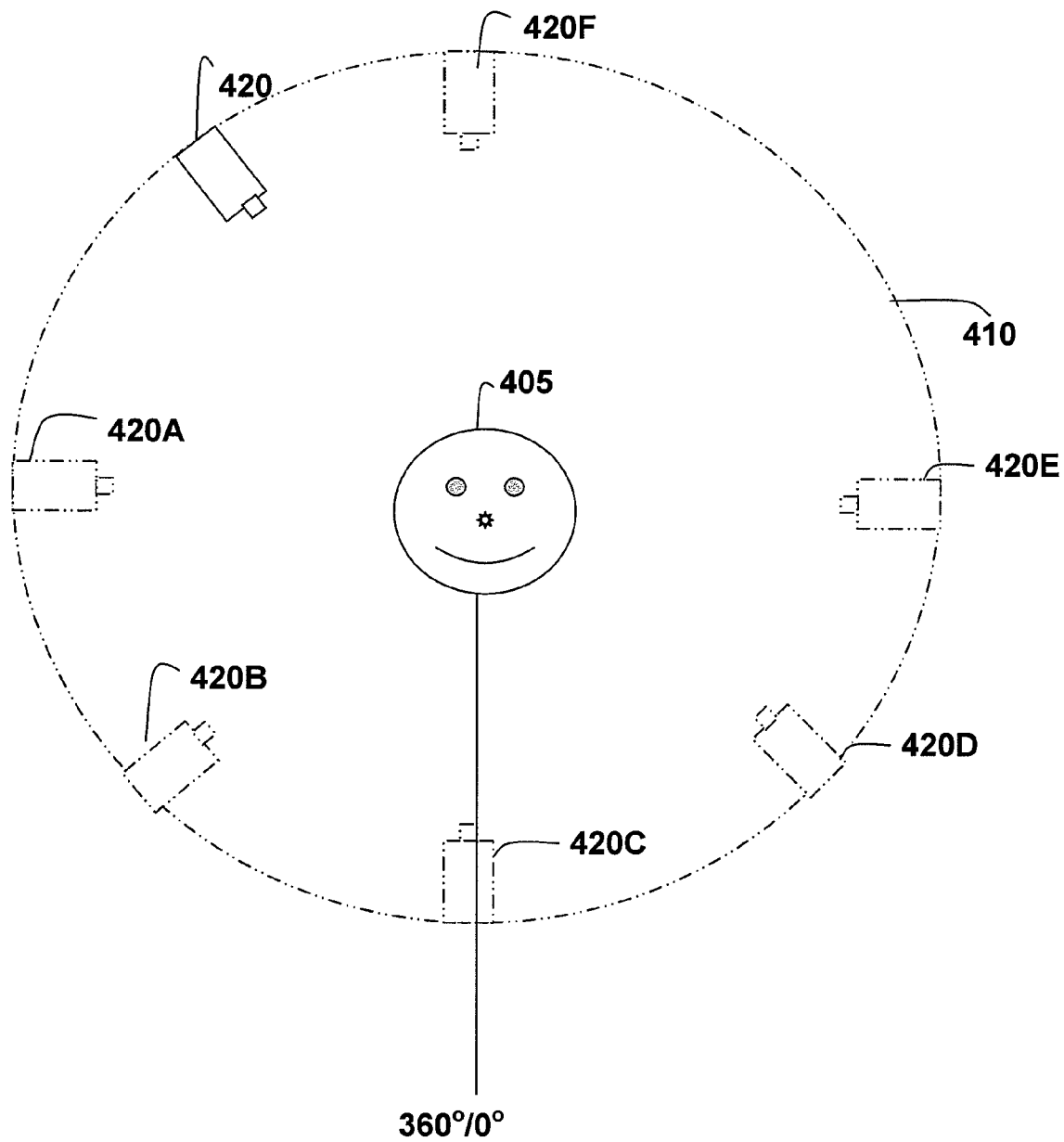
FIG. 4 illustrates an exemplary multi-image capture scheme for generating a model image according to an aspect of the present invention.

Referring to FIG. 4, an exemplary embodiment is provided for capturing one or more images for insertion by the CCAM 200, according to an aspect of the invention. For simplicity of explanation, the embodiment is shown to include planar-movement of an image capture device 420 in the two-dimensional X-Z plane, where the azimuth angle ($\Theta$) varies, but the altitude angle ($\phi$) is fixed at 0 degrees. However, the skilled artisan will readily recognize and appreciate that the image capture device 420 may also be moved in the third-dimension, where the altitude angle $\phi$ varies in a range between minus 90 degrees and plus 90 degrees so as to generate a complete three-dimensional image model of the subject 405.

Figure 6:
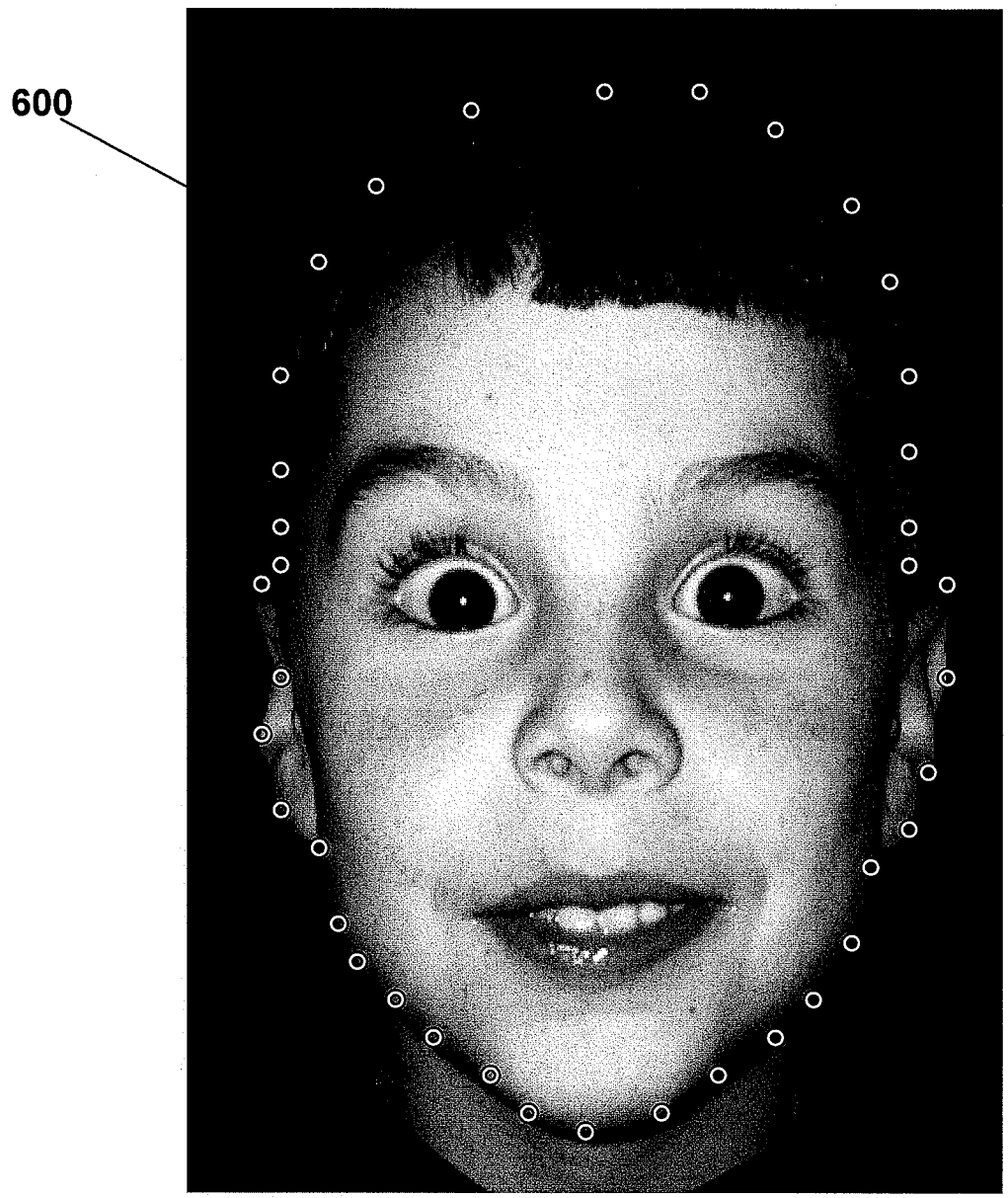
FIG. 6 is exemplary image showing a portion of a model image to be extracted according to an aspect of the present invention.

According to the depicted embodiment, the subject 405 is positioned at the center of a circular orbit 410 (or spherical orbit 410 in the case of three-dimensional image capture). The three-dimensional coordinates of the subject 405 relative to the position of image capture device 420 are determined and recorded through known coordinate-registration systems such as, for example, multi-point-touch registration, or by any other method capable of accurately registering a three dimensional position of one or more points on the surface of subject 405 relative to the image capture device 420. For example, as shown in FIG. 6, the image capture device 420 may be registered relative to the subject 405 by touching the subject 405 with an image registration device (not shown), included in the image capture device 420, or provided separately, at one or more of points 600 and recording the relative coordinates (x, y, z) of the one or more touched points 600.

The image capture device 420 is initialized at an arbitrary position such as, for example, 420A in FIG. 4. The three-dimensional coordinates corresponding to point 420A of the image capture device 420 are recorded for the initial position 420A, as well as the relationship between the image capture device 420 position and the position of subject 405. Moreover, the perspective angle of image capture is recorded for point 420A—in the non-limiting example shown in FIG. 4, the angle is 270 degrees, representing the right profile perspective image of the subject 405. The image capture device 420 may be moved through n discrete positions, where n is a whole number integer greater than or equal to one so as to capture various perspectives of the subject 405. The plurality of captured images, including positional information and respective perspective angles of image capture relative to the subject 405 are recorded such that a three-dimensional image may be reproduced.

Figure 5A:
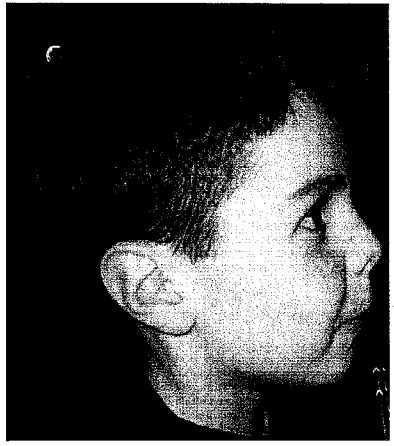
FIGS. 5A through 5F are exemplary images captured by the exemplary multi-image capture scheme of FIG. 4, according to an aspect of the present invention.
Figure 5B:
Figure 5C:
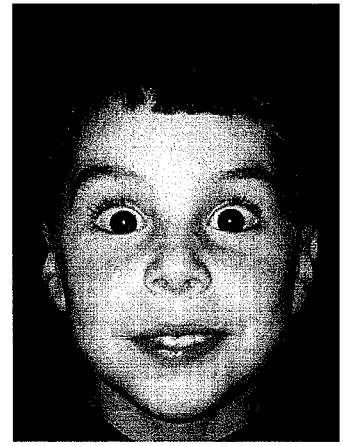
Figure 5D:
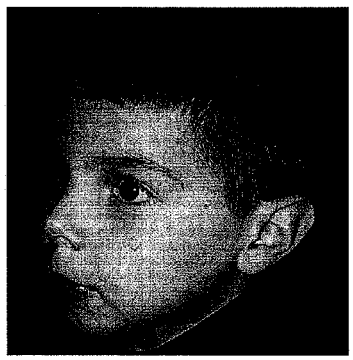
Figure 5E:
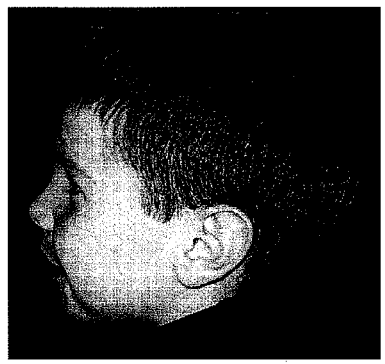
Figure 5F:

For example, referring to FIGS. 5A through 5F, six exemplary, non-limiting images (n=6) are shown that may be captured for the six respective positional points 420A to 420F (in FIG. 4) of the image capture device 420. For example, the image of the subject 405 captured from an initial position 420A of the image capture device 420 is depicted in FIG. 5A, which corresponds to a 270 degree offset from the reference axis (0 degrees) of a direct view of the subject's face image (shown, for example, in FIG. 5C). A second image of the subject 405 captured from the position 420B of the image capture device 420 is depicted in FIG. 5B, which corresponds to a 315 degree offset from the reference axis. A third image of the subject 405 captured from the position 420C of the image capture device 420 is depicted in FIG. 5C, which corresponds to the reference axis (0 degrees). A fourth image of the subject 405 captured from the position 420D of the image capture device 420 is depicted in FIG. 5D, which corresponds to a 45 degree offset from the reference axis. A fifth image of the subject image 405 captured from the position 420E of the image capture device 420 is depicted in FIG. 5E, which corresponds to a 90 degree offset from the reference axis. And, a sixth image of the subject 405 captured from the position 420F of the image capture device 420 is depicted in FIG. 5F, which corresponds to a 180 degrees offset from the reference axis.

The multiple captured images (e.g., FIGS. 5A to 5F) of the subject 405, including at least one image of the face of subject 405 (FIG. 5C), are processed and combined to create a three-dimensional image of the subject 405, as the skilled artisans will readily appreciate. The three-dimensional image of the subject 405, including each of the discrete images captured from the positions 420A to 420F in FIG. 4, are temporarily stored, referring to FIG. 2, in the CCAM 200 working memory, RAM 235, and subsequently recorded in Database 245 for subsequent retrieval.

A process that may be executed by CCAM 200, according to an aspect of the invention, will be described below, with reference to FIG. 7. Moreover, a computer readable medium is provided having recorded thereon code segments for each of the below described processes.

Figure 7:
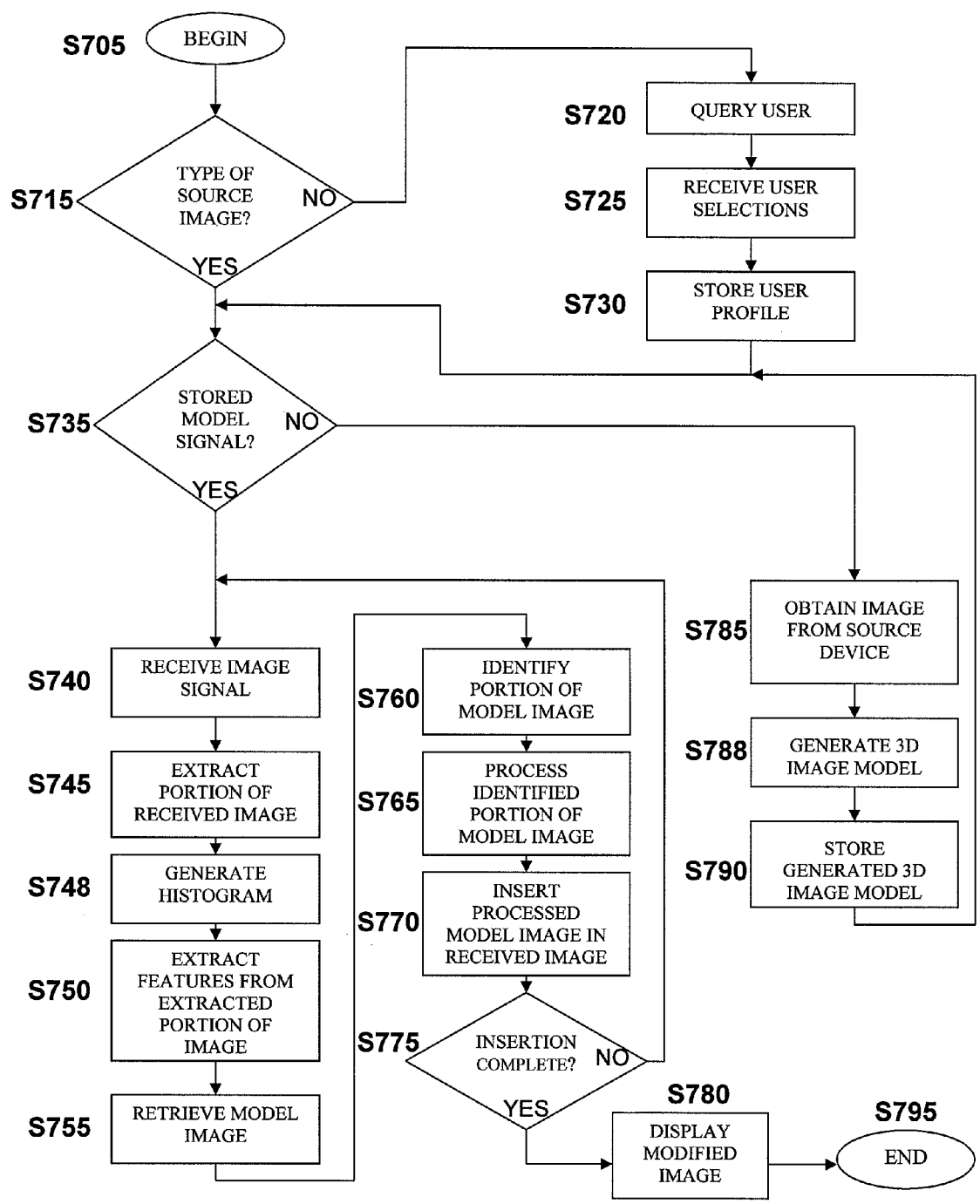
FIG. 7 is a flow diagram of an exemplary process for inserting a selected image in a selected category of advertisement according to an aspect of the present invention.

Referring to FIG. 7, the exemplary process begins (step S705) at initialization of the CCAM 200 and determines that image insertion has been selected by the user. The process determines whether one or more specific categories of source signals have been selected by the user (step S715). The categories may include, for example, various categories of television commercials. Hence, the user may select specific categories, including, but not limited to, advertisements for automobiles, hair products, men's clothing, men's accessories, women's clothing, women's accessories, baby products, pet products, etc. The various categories may be determined in a variety of ways, without departing from the spirit and/or scope of the invention. For example, the Broadcaster 120 may determine the categories of source signals, grouping advertisements according to the advertisers' instructions or its own cataloging systems. Alternatively, the users may create their own categories based on individual preferences.

If the process determines that a specific category of source signals has not been selected by the user ("NO" at step S715), the process queries the user for one or more specific categories (step S720). The query may be, for example, an interactive session provided via the display 110 (shown in FIG. 1) over a communication link such as, for example, the Network 115 (shown in FIG. 1) where the user is provided with a list of categories of source signals the user may select for image insertion.

The Settop box 105 may include an input device such as, for example, a keyboard (not shown), an interactive voice control module, or the like, by which the user may input information, including user selections. Further, the user may be provided with a telephone number or URL address which the user may contact and input selections via existing telephone hardware or computer hardware as is known in the related arts.

Alternatively, rather than an interactive session as described above, or in addition to the interactive session, the process may cause a survey or list to be mailed via a physical medium (such as, for example, United States Postal Service mail) or electronic medium (such as, for example, email, text messaging, instant messaging, etc.) to the user. The survey or list may include various types or categories of television advertisements that are commonly broadcast by, for example, Broadcaster 120 (shown in FIG. 1). The user would be invited to select those categories of advertisements within which the user desires to insert a user selected/defined image.

In addition to the survey or list, a questionnaire may be provided requesting user feedback and/or comments. The questionnaire may include questions directed to determining what type of further advertising the user would like to receive.

In an alternative embodiment, according to an aspect of the invention, the CCAM 200 may be integrated in the Broadcaster 120 rather than the Settop Box 105 (shown in FIG. 1). In this instance, a questionnaire may be provided to a user offering customized commercial advertisement. In addition to the offer, the questionnaire may request the user to select one or more categories of advertisements in which the user would like to insert a user selected image. The user would further be requested to provide a series of images (for example, shown in FIGS. 5A to 5F), discussed below with respect to step S785.

Returning to FIG. 7, upon completion of the interactive session with the user (step S720), for example, the process receives the user's selections of specific categories (step S725). The received user's selections (and images if applicable) are then stored in a user profile file (step S730), e.g., in the Database 245 (FIG. 2) and/or the Database 125 (FIG. 1), as discussed above. In addition to specific categories of advertisements desired to be modified to insert user defined images, the user profile file may include further information such as, user billing information; services provided to user; specific images that may be inserted; one or more look up tables listing stored images and types of advertisements in which the stored images may be inserted; user address, including mail and email addresses; user telephone number; user name and/or identification information; and/or one or more user defined avatars that may be inserted into the selected categories of advertisements.

The process then proceeds to determine whether one or more images for insertion have been stored (step S735). Likewise, If the process determines that a specific category of source image signal has been identified by the user ("YES" at step S715), the process determines whether one or more images have been stored (step S735).

If it is determined that one or more images are not stored ("NO" at step S735), the process queries the user through a user interface, such as, for example, the display 110 in FIG. 1, and obtains one or more images from a source device (step S785). The Settop box 105 may store the received one or more images in a portion of the Database 245, for example. The Settop box 105, via CCAM 200, inserts the user's selected images into the user defined categories of advertisements at the user site. The selected images may be inserted on a real-time basis as broadcast signals are received, or on an a priori basis where the selected images are inserted into advertisements and stored in Database 245, for example.

Alternatively, as discussed above, the query may occur through an interactive session with the user via the Network 115, on the user's display 110 (FIG. 1), or the query may be sent (via physical or electronic mail) to the user in the form of a survey, list and/or questionnaire, as discussed above with respect to step S725. The Broadcaster 120 may store the received series of images in a portion of the Database 125, for example, dedicated to the user. The Broadcaster 120 may insert the user's selected images into the user defined categories of advertisements at the transmitter end so that the user would receive, at the Settop Box 105, a multimedia signal that includes a modified image signal, including an inserted image. The selected images may be inserted on a real-time basis as broadcast signals are prepared for broadcast, or on an a priori basis where the selected images are inserted into advertisements, for example, and stored in Database 125.

The obtained one or more images are then processed to generate a three-dimensional model image (step S788), as discussed, for example, with respect to FIGS. 4-6. The three-dimensional model image, including the one or more images, is stored (step S790). Once the model image, including the one or more images, is stored (step S790), e.g., in the Database 245 (FIG. 2) and/or the Database 125 (FIG. 1), the process returns to the preceding inquiry, where a determination is made whether an image model has been stored (step S735).

If it is determined that one or more images are stored ("YES" at step S735), for example, at the Settop Box 105 or the Broadcaster 120, then the process receives a multimedia signal that includes a source image signal of the category identified by the user, decoded and converted into a base composite signal that includes an image field signal (step S740). In an embodiment, the multimedia signal may also need to be decrypted to obtain the base component signal. The image field signal is then analyzed, and one or more portions of the image field signal are extracted based on the analysis (step S745). The extracted one or more portions are transformed from the time domain to the frequency domain, and a histogram is generated for each of the extracted portions (step S748). The extracted one or more portions are further analyzed and features are extracted from the one or more extracted portions, generating motion vectors for the one or more extracted portions (step S750).

The process retrieves a user defined and selected model image (step S755), for example, stored at step S790. One or more portions of the retrieved model image are identified (step S760). The identified one or more portions of the model image are processed to adjust the attributes of the identified one or more portions of the model image, the attributes including, for example, edge-blending effect, scale, hue, brightness, color saturation, etc. (step S765). The processed one or more model image portions are inserted into the received image field signal in place of the one or more extracted portions, or as overlay onto the received image field signal (step S770). The process may insert or overlay the processed one or more model image portions into the received image field signal based on a received mode signal, which indicates selection of an insert mode, overlay mode, or a composite of insert and overlay modes.

The process determines if image insertion is completed (step S775). If image insertion is complete ("YES" at step S775), the modified image is displayed (step S780), for example, on the display 110, and the process ends (step S795). However, if the process determines that image insertion is not complete ("NO" at step S775), the process returns to receive further image field signals (step S740).

In this manner, a user is able to select a category of advertisements or other source media, which the user would like to modify with personalized images, sound, or other type of indicia. The selected category of advertisements may be modified at the user site or at the broadcaster site, thereby providing reproduction of personalized multimedia signals.

Although the above disclosure has been provided with examples of modifying multimedia signals to insert and/or overlay user-defined images, the skilled artisan will readily appreciate that multimedia signals may also be modified to insert and/or overlay sound signals, control signals, and like, without departing from the scope and/or spirit of the invention. For example, in addition or alternatively to processing video signals as discussed above, vowels, words, phrases, and/or other sounds may be implemented in modifying the multimedia signals to provide personalized audio portions of multimedia signals. In this regard, for example, a user may store vowels, words, phrases, and/or other sounds and the Processor 255 (in FIG. 2) may generate one or more signature files based on the stored sounds to generate sound signals to be inserted or overlayed in the received multimedia signal, which may be in the form of a radio broadcast signal.

Further, the apparatus, method and/or computer readable medium discussed above may include modifying received radio programs and/or advertisements by inserting and/or overlaying user-defined sound signals. In this regard, the received radio programs may be broadcast by satellite radio broadcast entities.

Further, the apparatus, method and/or computer readable medium discussed above may include modifying received video and/or sound signals received from a computer game device, which may be a standalone computer or a remote computer connected via a network (such as, for example, a local area network, a wide area network, or the like), to insert and/or overlay user-defined image and/or sound signals. In this regard, user defined objects, which may include video and/or audio, may be inserted and/or overlayed into a received multimedia signal from the computer game device such that a displayed video game will include user defined objects. For example, a computer game user may insert or overlay an image of his own face and/or the user's own voice instead of the face and/or voice of a character in a computer game.

Further, the term "insert," or any derivative thereof, as used in herein, is meant to also include "overlay," or any derivative thereof, and/or "blend," or any derivative thereof.

Further, the apparatus, method and/or computer readable medium discussed above may include user-specific and/or account-specific customized modification information. For example, a plurality of profiles may be provided that include parameters specific to one or more users and/or user accounts. Each profile may contain one or more of the following parameters for personalized modification of advertisements, or other source media. The parameters may include, for example, a password to access the user profile and/or activate personalized image insertion; at least one selected category of advertisement, or other source media; billing information specific to the user and/or user account; services provided to the specific user and/or user account; specific images that may be inserted for the specific user and/or user account; one or more look up tables listing stored images and types of advertisements in which the stored images may be inserted for the specific user and/or user account; user address, including mail and email addresses for the specific user and/or user account; at least one telephone number for the specific user and/or user account; a user name and/or identification information, including biometric information such as, for example, fingerprint, retinal print, and the like; and/or one or more user defined avatars that may be inserted into the selected categories of advertisements for the specific user and/or user account.

Further, the invention may be used in systems including, for example, a server-client relationship and/or peer-to-peer relationship. The invention may be used by service providers such as, for example, Internet service providers so as to enable users to personalize advertisements that may be reproduced at the terminals of the users, including such advertisements as, for example, pop-advertisements, and the like.

Further, the invention may be used by program broadcasters, including television and radio broadcasters and/or other service providers, to modify transmitted programs such as, for example, television shows, including game shows, "sitcoms," "made-for-television movies," with personalized images and/or sounds. For example, user-defined multimedia signals, including images and/or sounds, may be sent to a television or radio broadcaster, which then uses the user-defined multimedia signals to modify a transmitted game show so as to insert or overlay the user-defined multimedia signal, including images, sounds and/or other indicia, to alter or customize the appearance or voice of the contestants and/or host.

The selected category of advertisements may be modified at a user site. Personalized information provided by a user may be stored, retrieved, processed and inserted or overlaid at the user site into received multimedia signals to provide reproduction of personalized multimedia signals.

Further, the selected category of advertisements may be modified at a broadcaster site. In that case, personalized information may be provided from a user to a broadcaster via a communication link, including physical or electronic communication media. The personalized information may be stored, retrieved, processed and inserted or overlaid at the broadcaster site into multimedia signals that are transmitted, or may be transmitted at some later time to one or more user sites.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Accordingly, replacement standards and protocols having the same functions are considered equivalents.

What is claimed is:

1. An object insertion apparatus for inserting a model object into at least one program, the apparatus comprising:
   a memory that stores the model object;
   a selector that receives a selection of the model object and a selection of a category of program, the category of program comprising the at least one program;
   an object extractor that determines an object field within the at least one program;
   a feature extractor that identifies a first feature of the object field and determines at least one motion vector that defines a movement of the first feature of the object field;

an inserter that inserts the model object into the at least one program based on the selection of the category of program and in correspondence with the object field; and an adjuster that moves a second feature of the model object relative to the object field based on the at least one motion vector that defines the movement of the first feature of the object field within the at least one program.

2. The object insertion apparatus according to claim 1, wherein the object insertion apparatus is located at a transmitter site that transmits the at least one program to a user site.

3. The object insertion apparatus according to claim 2, further comprising:

a communicator that communicates with the user site, the communicator receiving the selection of the model object and the selection of the category of program from the user site.

4. The object insertion apparatus according to claim 3, the inserter comprising:

an object processor that modifies the model object based on the object field and the first feature of the object field so that the second feature of the model object corresponds with the first feature of the object field.

5. The object insertion apparatus according to claim 4, further comprising:

a decryptor that decrypts a multimedia signal representing the at least one program;

a decoder that decodes the decrypted multimedia signal; and a format converter that converts the decoded multimedia signal to a base composite signal, the base composite signal comprising the object field.

6. The object insertion apparatus according to claim 1, wherein the model object comprises an image, and wherein the at least one program comprises an advertisement.

7. The object insertion apparatus according to claim 1, wherein the model object comprises a sound, and wherein the at least one program comprises an advertisement.

8. The object insertion apparatus according to claim 4, further comprising:

an encryptor that encrypts a base composite signal comprising the object field;

an encoder that encodes the base composite signal; and a format converter that converts the base composite signal to a multimedia signal.

9. The object insertion apparatus according to claim 3, further comprising:

an object processor that adjusts at least one of a hue, saturation, contrast, brightness, and color temperature of the model object based on the object field for blending the model object into the at least one program.

10. An object insertion method for inserting a selected object into at least one program, the at least one program being associated with one of a plurality of categories of programs, comprising:

receiving a selection of a category of program from the plurality of categories of programs, the selection of the category of program comprising the at least one program;

receiving a selection of a model object, the model object being selected from at least one stored model object;

determining an object field within the at least one program;

identifying a first feature of the object field and determining at least one motion vector that defines a movement of the first feature of the object field;

inserting the selected model object in the at least one program based on the selection of the category of program and in correspondence with the object field; and moving a second feature of the model object relative to the object field based on the at least one motion vector that defines the movement of the first feature of the object field within the at least one program.

11. The object insertion method according to claim 10, wherein the model object comprises an image, and wherein the at least one program comprises an advertisement.

12. The object insertion method according to claim 10, wherein the inserting is performed at a transmitter site that transmits the at least one program to a user site.

13. The object insertion method according to claim 12, further comprising:

receiving a selection of at least one of an insert mode and an overlay mode.

14. The object insertion method according to claim 12, wherein, receiving the selection of the category of program and receiving the selection of the model object comprises receiving one of a survey and a questionnaire, from a subscriber, via one of physical mail and electronic mail.

15. The object insertion method according to claim 10, wherein the inserting comprises:

modifying the model object based on the object field and the first feature of the object field so that the second feature of the model object corresponds with the first feature of the object field.

16. The object insertion method according to claim 10, wherein the model object comprises a sound, and wherein the at least one program comprises an advertisement.

17. The object insertion method according to claim 10, further comprising:

adjusting at least one of a hue, saturation, contrast, brightness, and color temperature of the model object based on the object field for blending the model object into the at least one program.

18. A non-transitory computer readable medium for storing a program that inserts a selected object into at least one program, the at least one program being associated with one of a plurality of categories of programs, the computer readable medium comprising:

a category selection receiving code segment that receives a selection of a category of program from the plurality of categories of programs, the selection of the category of program comprising the at least one program;

a model object selection receiving code segment that receives a selection of a model object from at least one stored model object based on the selected category of program;

an object extracting code segment that determines an object field within the at least one program;

a feature extractor that identifies a first feature of the object field and determines at least one motion vector that defines a movement of the first feature of the object field;

an inserting code segment that inserts the model object in the at least one program in correspondence with the object field; and an adjusting code segment that moves a second feature of the model object relative to the object field based on the at least one motion vector that defines the movement of the first feature of the object field within the at least one program.

19. The computer readable medium according to claim 18, further comprising:

a mode receiving code segment that receives a selection of at least one of an insert mode and an overlay mode.

20. The computer readable medium according to claim 18, further comprising:
a modifying code segment that modifies the model object based on the object field and the first feature of the object field so that the second feature of the model object corresponds with the first feature of the object field.

* * * * *